United States Patent [19]

Kamitomo

[11] Patent Number: 4,907,258
[45] Date of Patent: Mar. 6, 1990

[54] KEY TELEPHONE APPARATUS

[75] Inventor: Fukashi Kamitomo, Fukuoka, Japan

[73] Assignee: Matsushita Electric Industrial Co., Ltd., Osaka, Japan

[21] Appl. No.: 336,906

[22] Filed: Apr. 12, 1989

[51] Int. Cl.[4] .................. H04M 1/72; H04M 3/42
[52] U.S. Cl. ................................ 379/157; 379/209
[58] Field of Search ............... 379/156, 157, 209, 355

[56] References Cited

U.S. PATENT DOCUMENTS 4,511,766 4/1985 Shah .................................. 379/157

Primary Examiner—Stafford D. Schreyer
Attorney, Agent, or Firm—Wenderoth, Lind & Ponack

[57] ABSTRACT

A key telephone apparatus includes a main device which is connected to a telephone network line and a plurality of extension telephones connected to the main device. When the line dialed from the extension telephone is busy, the busy tone signal transmitted to the extension telephone is detected by a tone detection circuit provided in the extension telephone. In response to the detection of the busy tone signal, a controller provided in the extension telephone produces a redial command which is applied to a controller provided in the main device. Thus, a controller redials for the same line after a predetermined time interval. If the line is still busy as detected by the tone detection circuit in the extension telephone, the controller provided in the extension telephone sends the redial command to the controller provided in the main device which repeats the redialing after the predetermined interval.

3 Claims, 5 Drawing Sheets

KEY TELEPHONE APPARATUS

BACKGROUND OF THE INVENTION

1. Field of the Invention

The present invention relates to a key telephone apparatus.

2. Description of the Prior Art

Among a number of functions equipped in a telephone, there is an auto-redialing function. This function is used, for example, in a case of hurry so that when the line of the called station is busy, the telephone at the calling station automatically redials the number of the called station again and again until the line is connected. For some telephones, such as an auto-redialing function is equipped in the telephone itself, but for the key telephone devices incorporating microcomputers, the auto-redialing function is equipped in a main device having the switching function. An example of such a key telephone apparatus is explained below.

Referring to FIG. 5, a prior art key telephone apparatus is shown in which reference number 51 is a main device, and 52 is one of a plurality of key telephones connected to main device 51.

Provided in each key telephone 52 are a key telephone circuit 53, a handset 54 and a handset circuit 55 having a voice amplifier, etc. A reference number 56 is a 2-line/4-line inverter, 57 is an LED display for displaying various operating conditions, 58 is a control panel having a number of key buttons to select operation, 59 is a data transmission and receiving circuit for effecting the data transmission and receiving with the main device 51, and 60 is a hook switch turned on and off by handset 55.

In the main device 51, 62 is a key telephone system unit control circuit including a microcomputer, 63 is a data transmission and receiving circuit for effecting the data transmission with a key telephone 52, 64 are station circuits provided for each extension telephone, 65 is a trunk circuit for effecting the capturing or releasing the telephone network line, such as a trunk line, and for detecting the called signal, 66 is a switching network for establishing a channel between the trunk line and the extension, 67 is a dial signal sending circuit for sending a dialing signal to the trunk line in accordance with the signal from control circuit 62, 68 is a dial memory for storing telephone number data for auto-dialing or for temporarily storing telephone number data for auto-redialing, and 69 is a tone detection circuit for detecting the tone signal, such as a line busy signal. The detected tone signal will be applied to control circuit 62. Tone detection circuit 69 can be connected to trunk circuit 65 through switching network 66.

According to the prior art key telephone apparatus described above, the transmission between the main device 51 and each key telephone is carried out by two lines, voice line for sending voice signal and data line for sending control data. By this arrangement it is possible to exchange data frequently between the key telephone 52 and the main device 51. Usually, many function are equipped and centered in the main device 51 so that during operation, each key telephone sends a function request signal, such as an auto-redialing function request signal, through the data line to the main device in which the microcomputer in control circuit 62 takes care of the requests as it receives the request signals from number of key telephones in a timesharing manner.

A further explanation on the auto-redialing function will be given. When the main device 51 receives from one key telephone a data representing the telephone number of the called station and the auto-redialing function request signal through the data line, control circuit 62 operates dial signal sending circuit 67 to send out the dial signal to the trunk line. When the dial signal is sent out to the trunk line, switching network 66 is operated to connect the tone detection circuit 69 with trunk circuit 65. Thereafter, control circuit 62 detects the sound signal transmitted from tone detection circuit 69. If the detected sound signal is a line busy tone signal, control circuit 62 redials the same number after a predetermined time interval. If, on the other hand, the detected sound signal is a ringing signal, the control circuit 62 controls switching network 66 to break the connection between the tone detection circuit 69 and the trunk circuit 65 and, also to make a connection between one station circuit 64 and trunk circuit 65.

According to the above described prior art arrangement, since the tone detection circuit 69 is provided in the main device 51, the detection of the line busy signal is carried out in the microcomputer of the main device 51. This will result in overload work of the microcomputer, as explained below.

Since the microcomputer in the main device 51 receives various request signals from number of key telephones in a time-sharing manner, the detection of the line busy signal must be carried out within the corresponding time slot assigned to each key telephone. However, if the number of key telephones connected to the main device increases, or if the number of function available to each key telephone increases, work assigned to the microcomputer increases. Under such a condition, the detection of the line busy signal may be an over burden to the microcomputer.

Alternatively, if it is so arranged that switching network 66 connects the tone detection circuit 69 with the trunk circuit 65 without any control by control circuit 62, the line busy signal may be detected by the tone detection circuit 69, but such a line busy signal will not be sent to the key telephone. In this case, the trunk line will be connected to the key telephone only after the detection of the ringing signal. Therefore, in this case, the user of the key telephone will not here the dialing sound or line busy signal. Thus, the user who is used to use the conventional type telephone will feel some anxiety, particularly when the line is busy, whether or not the telephone is operating properly, until he/she hears the ringing signal.

In consideration of the above, the speaker circuit of the extension key telephone may be connected with the tone detection circuit 69 and have its own line busy signal detection circuit. This arrangement will result in reducing the load of the microcomputer in the main device 51, and also will enable the user to hear the line busy signal or the ringing signal.

However, there is still a problem, even after the employment of the line busy signal detection circuit in each extension key telephone, such that an exact time when the dialing signal has completely sent out to the trunk line can not be detected, because the sending of the dialing signal is done within the main device 51. Therefore, the detection of the line busy signal, which should be carried out after the dialing signal has been sent, will not be carried out at a desired timed relation with the dialing.

SUMMARY OF THE INVENTION

The present invention has been developed with a view to substantially solving the above described disadvantages and has for its essential object to provide an improved key telephone apparatus which can operate with a high efficiency.

Also, an object of the present invention is to provide a key telephone apparatus which can start the detection process of the busy tone with a accurate timing.

In accomplishing these and other objects, a key telephone apparatus according to the present invention comprises a main device which is connected to a telephone network line and a plurality of extension telephones connected to the main device through a voice transmission line for sending voice signal and a data transmission line for sending control data.

According to the present invention, the main device comprises switching means for connecting at least one of the extension telephone with the telephone network line, means for sending dial signal to the telephone network line in accordance with a dial command signal obtained from the extension telephone through the data transmission line, means for connecting the telephone network line with the extension telephone through the voice transmission line in accordance with the dial command signal, and means for generating and sending a sound detection start command through the data transmission line to the extension telephone after the completion of sending the dial signal to the telephone network line by the dial signal sending means.

According to the present invention, the extension telephone comprises inputting means for inputting a redial command, tone detection circuit for detecting a tone signal transmitted through the voice transmission line from the main device, means for generating and sending the dial command signal through the data transmission line to the main device in accordance with the redial command, means, activated by the sound detection start command, for detecting a busy tone signal in an output signal from the tone detection circuit, and means for regenerating the dial command signal when the detecting means detects the busy tone signal.

According to a preferred embodiment of the invention, the extension telephone further comprises a speaker system for changing the signal obtained through the voice transmission line from the main device to audible signal, a microphone system for transducing sound to electric signal for sending through the voice transmission line, and a directional coupler provided to the speaker system and microphone system for preventing a cross talk between the systems.

Also, according to a preferred embodiment of the invention, the tone detection circuit is connected to the speaker system.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENTS

Figure 1:
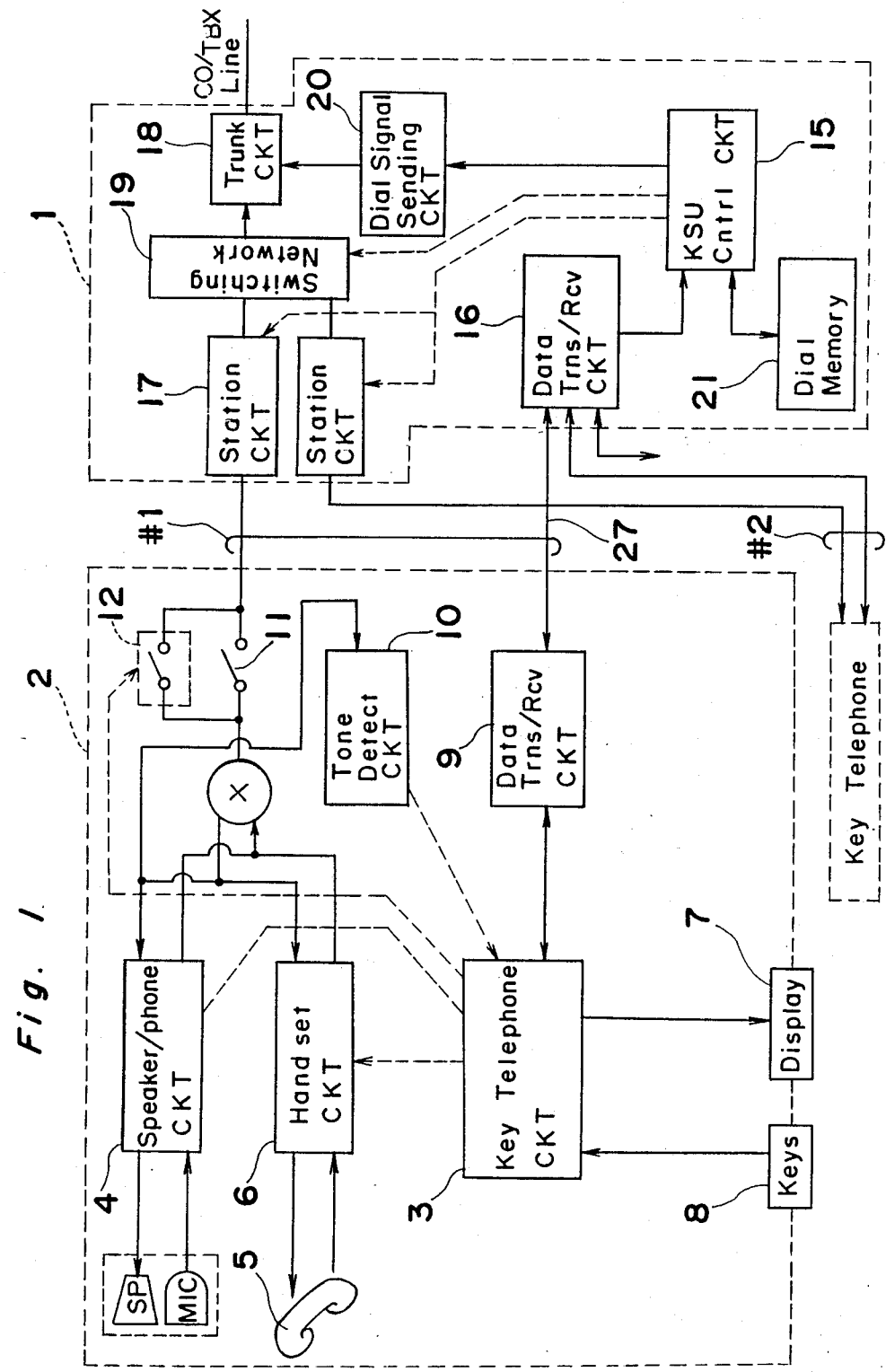
FIG. 1 is a block diagram of a key telephone apparatus according to a preferred embodiment of the present invention.

Referring to FIG. 1, a key telephone apparatus according to a preferred embodiment of the present invention is shown in which reference number 1 is a main device, and 2 is one of a plurality of key telephones connected to main device 51.

Provided in each key telephone 2 are a key telephone circuit 3, a speaker/phone circuit 4 which operates when the device is used as a speaker telephone. Further provided are a handset 5, a handset circuit 6, an LED display 7 for displaying various operating conditions of the key telephone, and a control panel 8 having a number of key buttons to select operation. Further provided are a data transmission and receiving circuit 9 for effecting the data transmission with the main device 1, a tone detection circuit 10 for detecting a tone signal from the signals transmitted through a voice transmission line, a hook switch 11 turned on and off by a handset 5, and a hand-free relay switch 12 connected parallel to hook switch 11 and operated by key telephone circuit 3.

Provided in the main device 1 are a key telephone system unit 15, a data transmission and receiving circuit 16 for effecting the data transmission with a key telephone 2, and station circuits 17 provided for the number of extensions for effecting the voice signal transmission. Station circuit 17 includes a bidirectional amplifier for the voice frequency band, and an impedance matching circuit. Further provided are a trunk circuit 18 for controlling the capturing or releasing the telephone network line, such as a trunk line and for detecting the called signal, a switching network 19 for establishing a channel between the trunk line and the extension, a dial signal sending circuit 20 for sending a dialing signal to the trunk line in accordance with the signal from controller 15, and a dial memory 21 for storing telephone number data for auto-dialing or for temporarily storing telephone number data for auto-redialing. In the dial memory 21, the user previously stores and registers a plurality of telephone numbers together with short register numbers. An auto-dialing function operates such that when one register number is specified by the user, a corresponding telephone number is read out from dial memory 21 for effecting the telephone number dialing automatically. An auto-redialing function uses a portion of this auto-dialing function, such as the dial signal sending circuit 20 provided in the main device 1. The dial signal sending circuit 20 produces a series of dial pulse signals to the trunk line in accordance with the data read out from the dial memory 21 by the controller. Once the operation command is applied, the dial signal sending circuit 20 continues to operate by itself without any external control.

Figure 2:
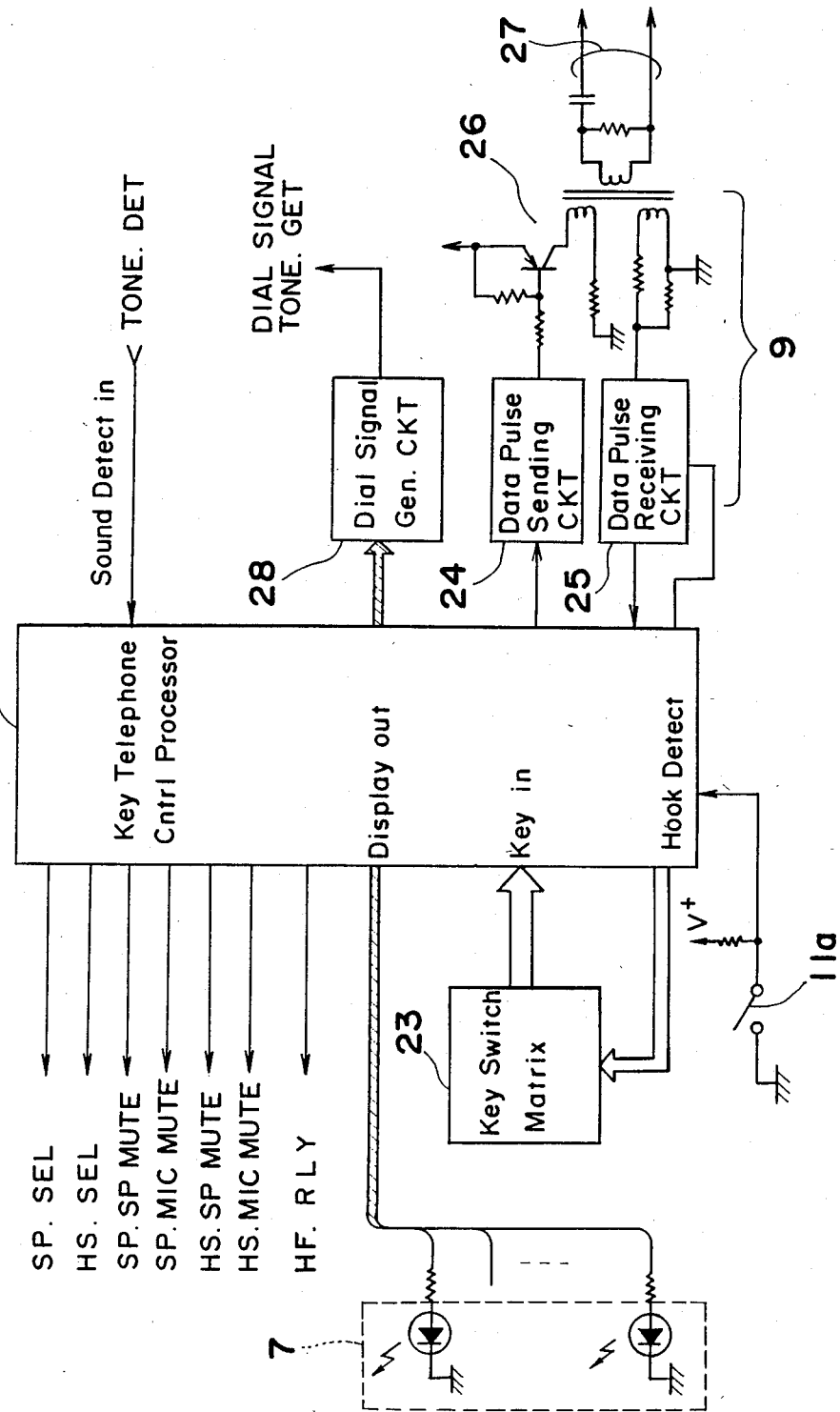
FIG. 2 is a circuit diagram of a portion of an extension telephone.
Figure 3:
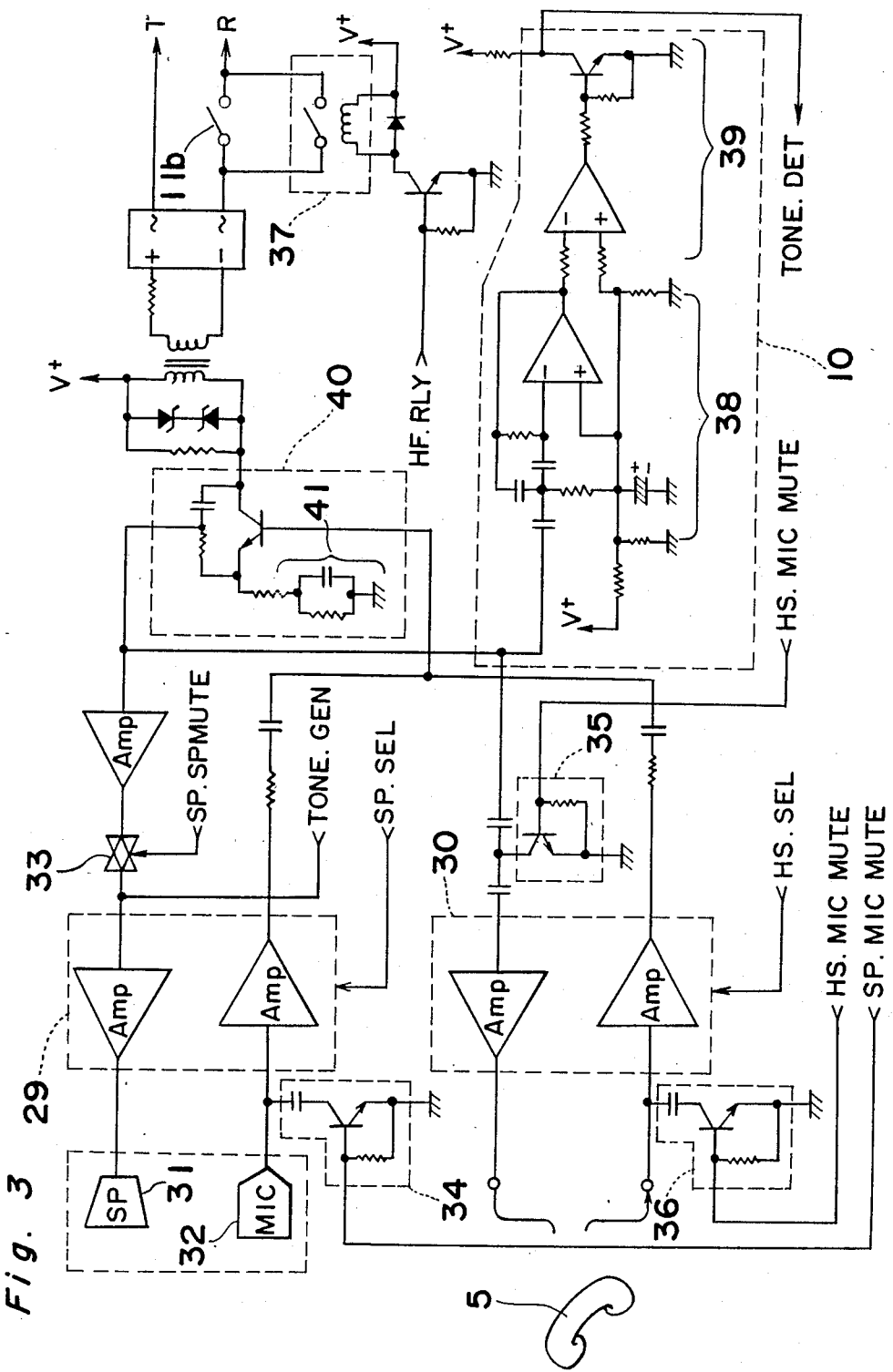
FIG. 3 is a circuit diagram of a different portion of an extension telephone.

Referring to FIGS. 2 and 3, a detailed circuit diagram of the key telephone 2 is shown. In FIG. 2, reference number 22 is a microprocessor which will be the essential part of key telephone circuit 3, and 23 is a key switch matrix for the control panel 8. In the data transmission and receiving circuit 9, reference number 24 is a data pulse sending circuit, 25 is a data pulse receiving circuit, and 26 is a pulse transformer. An output of data pulse sending circuit 24 is connected through amplifier and pulse transformer 26 to a data transmission line 27. Similarly, an input of data pulse receiving circuit 25 is connected through pulse transformer 26 to data transmission line 27. Reference number 28 is a tone generator for generating tones such as key click tone and receipt tone.

Referring to FIG. 3, reference number 29 is a speaker/phone amplifier set for a speaker/phone arrangement, 30 is a handset amplifier set having an amplifier for driving a speaker portion and an amplifier for amplifying the signal from a microphone portion. When the telephone apparatus operates under the speaker/phone mode, the speaker/phone amplifier set 29 is operated, and when the same operates under the handset mode, the handset amplifier set 30 is operated. The switching between the speaker/phone amplifier set 29 and handset amplifier set 30 is effected by a signal produced from microprocessor 22. Reference numbers 31 and 32 are speaker and microphone, respectively, for the speaker/phone arrangement. Reference number 33 is a speaker/phone speaker muting circuit for attenuating the signal transmitted to speaker 31 in accordance with the signal produced from microprocessor 22, and 34 is also a speaker/phone microphone muting circuit for attenuating the signal transmitted from microphone 32 in accordance with the signal produced from microprocessor 22. Reference numbers 35 and 36 are respectively, a handset speaker muting circuit for attenuating a signal applied to speaker provided in the handset 5 in accordance with the signal produced from microprocessor 22 and a handset microphone muting circuit for attenuating a signal produced from microphone provided in the handset 5 in accordance with the signal produced from microprocessor 22.

When the auto-redialing function is selected, handfree relay switch 12 operates in response to the signal from microprocessor 22. Thus, under the auto-redialing function, the connected telephone line will not be broken even when the operator hangs up the handset. The hook switch 11 includes a double contact switch in which one contact switch portion 11a, as shown in FIG. 2, is connected to microprocessor 22 for sending the hook detection signal, and other contact switch portion 11b is used for the continuous connection of the telephone line.

In tone detection circuit 10, 38 is filter for eliminating AC components, 39 is a converter for changing the output signal from filter 38 to a binary signal, and 40 is a directional coupler having a quasi impedance circuit 41 which provides the same impedance as the impedance viewed in to the switching side.

In operation, under the auto-redialing function, the data transmission between the main device 1 and the key telephone apparatus 2 is carried out as described below in connection with FIG. 4.

It is assumed that the user had already dialed a telephone number, but the line was busy. According to the present embodiment, the auto-redialing function can be selected only when the key telephone 2 is in the hand-free condition, i.e., when speaker/phone amplifier set 29 is operated so that hand-free relay switch 12 is turned on. Under this condition, when the user operates a certain button switch provided in the control panel 8, the key telephone circuit 3 provided in the key telephone 2 sends a redialing order data (RDL) from data transmission and receiving circuit 9 to data transmission and receiving circuit 16 in the main device 1 through data transmission line 27. In response to the receipt of this data (RDL), the key telephone system unit control circuit 15 in the main device 1 controls the switching circuit 19 in the key telephone 2 so as to connect the station circuit 17 and the trunk circuit 18 and, at the same time, captures the trunk line which is used for sending the dial signal in the previous dialing. Since the dial data used in the previous dialing is stored in memory 21, the same dial data is transmitted to dial signal sending circuit 20 which sequentially generates the dial signal and sends it out through trunk circuit 18 to trunk line.

Figure 4:
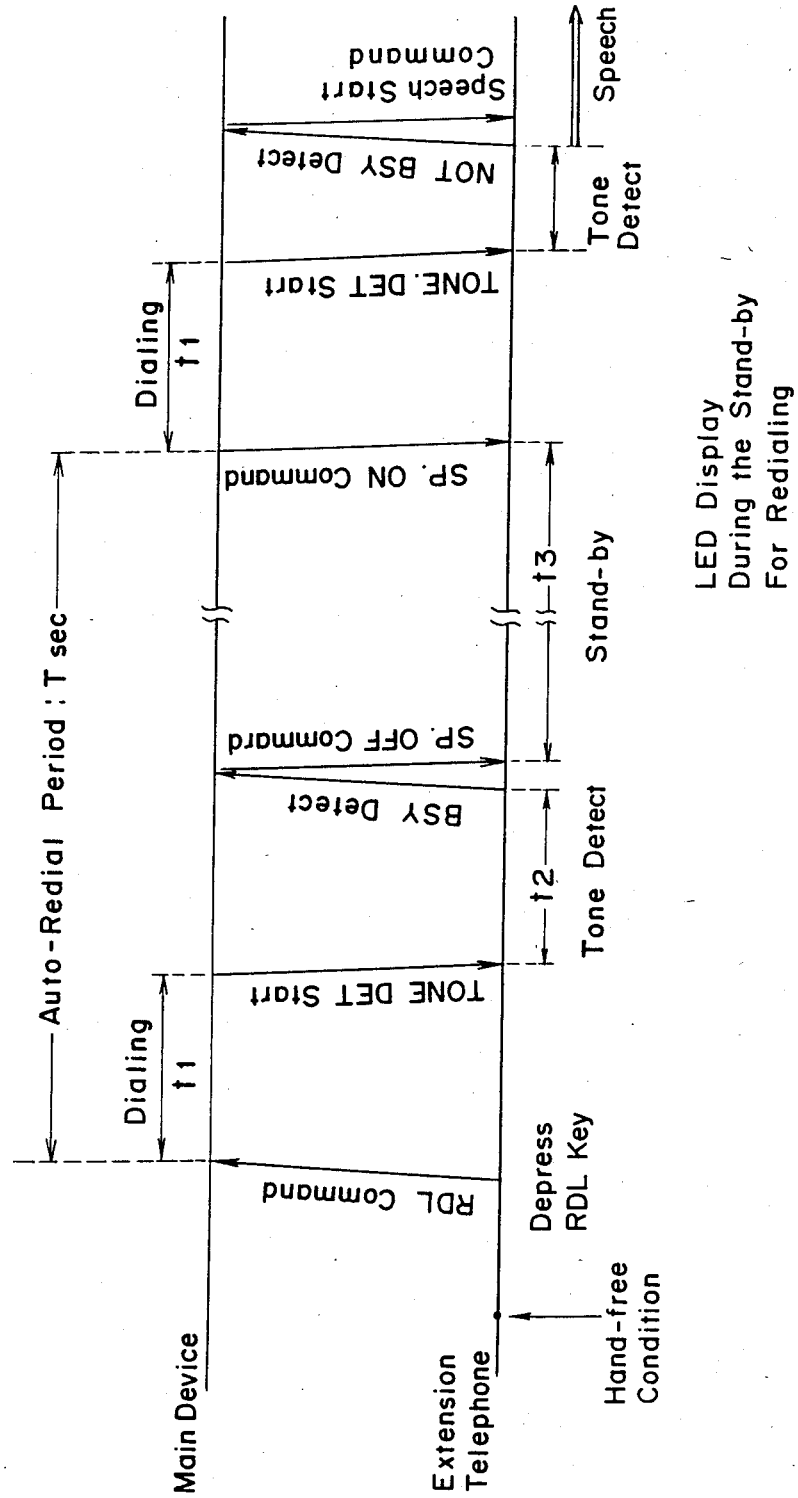
FIG. 4 is a time chart showing signal transmission between the main device and extension telephone.
Figure 5:
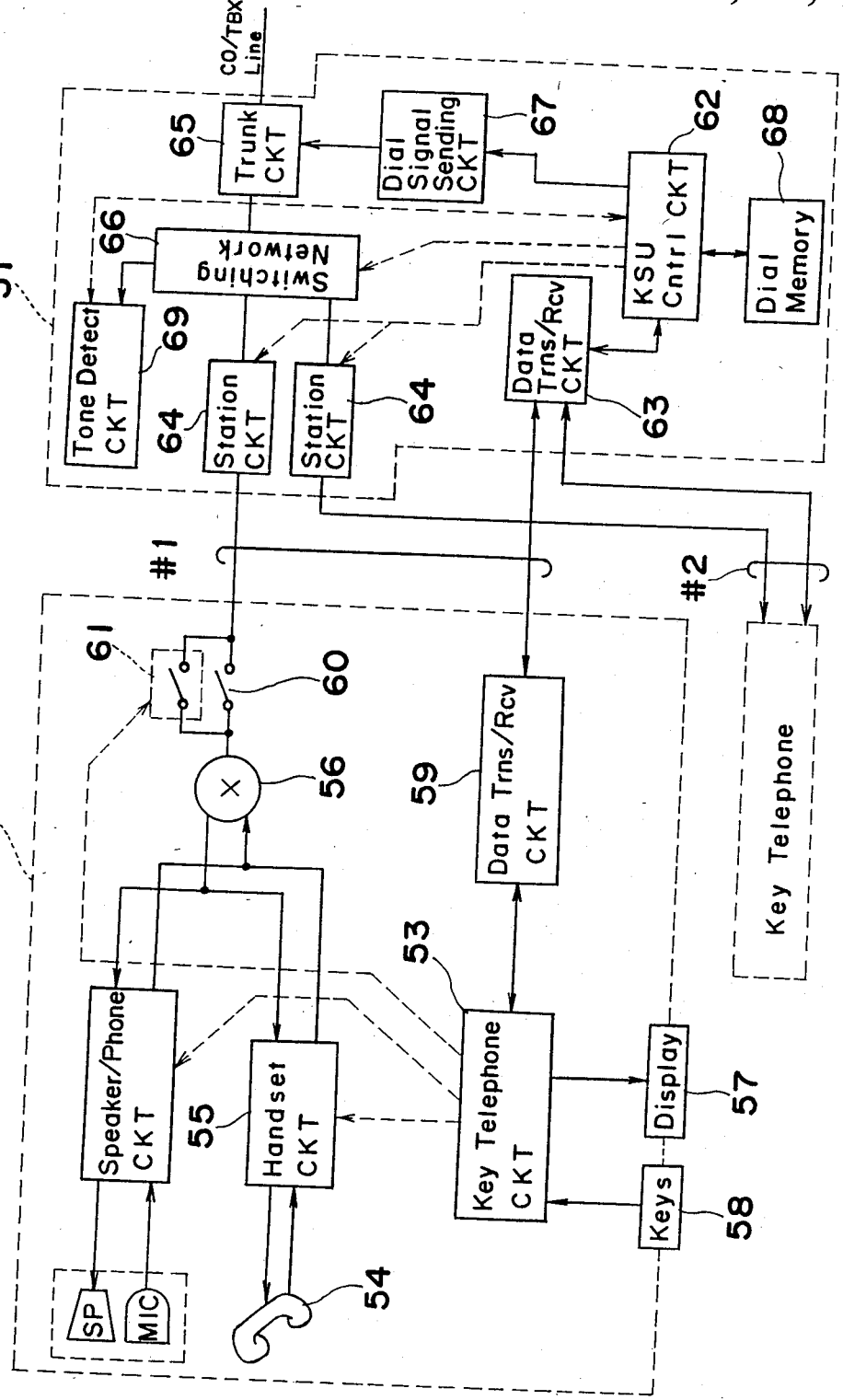
FIG. 5 is a block diagram of a key telephone apparatus according to prior art.

In FIG. 4, time t1 is the time necessary to retry the dialing of the dial signal effected by the dial signal sending circuit 20. During this dialing, the operator may listen to the dialing sound through speaker 31.

When a predetermined time passes after the dialing, a line busy tone signal will be returned if the line is busy, a ringing signal will be returned if the line is not busy, or someone's voice will be returned if someone answers the phone. Such returned signal will be applied to tone detection circuit 10 and, at the same time, to speaker 31 so that the user of the key telephone can hear the returned signal, which may be either one of the line busy tone signal, ringing signal or someone's answer.

After sending the dial data to dial signal sending circuit 20, control circuit 15 in the main device 1 checks whether or not the dial signal sending circuit 20 has completed in sending all the dial signal to the trunk line. If circuit 20 has completed sending the dial signal, control circuit 15 produces a sound detection start command (TONE DET) through data transmission and receiving circuit 16 to key telephone circuit 3 in the key telephone 2. Thereafter, in response to the sound detection start command (TONE DET), telephone circuit 3 starts to process the busy tone detection. As explained above, since a telephone line connection is established between the trunk line and the extension line by switching network 19, the dial signal transmitted through the trunk line is also transmitted to the key telephone as a side tone which will be applied to the tone detection circuit 10 before the busy tone reaches the circuit 10. However, according to the present embodiment, since the main device sends the sound detection start command (TONE DET) to the key telephone after the dial signal is completely transmitted to the trunk line, the processing of the busy tone detection is started only after the dial signal is completely transmitted to the trunk line. Thus, no error detection will be carried out by the side tone.

In the processing of the busy tone detection, a detection signal from tone detection circuit 10 is checked to discriminate between the busy tone signal and ringing signal by the detection of sound pattern, such as by the ratio of sound continuing time and pause time. In FIG. 4, time t2 is necessary to detect the busy tone signal. If a busy tone signal is detected, telephone circuit 3 sends a busy detection confirm data (BSY) through data transmission and receiving circuit 9 to control circuit 15 in the main device 1. Thereupon, control circuit 15 controls the trunk circuit 18 to release the trunk line and to disconnect the station circuit 17 with trunk circuit 18. Thereafter, control circuit 15 sends a stand-by command (SP OFF) through data transmission and receiving circuit 16 to key telephone 2 to make the key telephone 2 in a stand-by condition. Thus, by the stand-by command, key telephone circuit 3 stops the operation of speaker/phone amplifier set 29 and, at the same time, opens the hand-free relay switch 12, and also indicates the stand-by condition through LED display 7.

During the processing of the busy tone detection, the speaker/phone microphone muting circuit 34 is operated so that any sound entered through microphone 32 is cut off to prevent the tone detection circuit 10 to receive any noise signal, other than the tone signal, through the telephone line.

When a predetermined period of time T passes from the start of the previous redialing operation, the second redialing operation starts. To this end, control circuit 15 of the main device sends redial start command (SP ON) through data transmission and receiving circuit 16 to key telephone circuit 3 in the key telephone 2. Thus, key telephone circuit 3 makes speaker/phone amplifier set 29 operative and, at the same time, closes the hand-free relay switch 12. Also, control circuit 15 in the main device connects the line between the station circuit 17 and trunk circuit 18, and captures the trunk line which is used in the previous redialing operation. Thereafter, the dial data used in the previous dialing as stored in memory 21 is fetched and sent to dial signal sending circuit 20. Thus, the dial signal is sequentially sent out through trunk circuit 18 to trunk.

Thereafter, in the same manner as before, the tone is checked by the tone detection circuit 10. If the line busy tone signal is detected, the redial stand-by condition is established so that the redialing can be effected for the third time after the predetermined time T from the start dialing of the second redialing operation. On the other hand, if the ringing signal is detected, the auto-redialing function is terminated in the following manner. First, from key telephone circuit 3 in the key telephone 2, a ringing condition confirm data (NOT BSY) is sent through data transmission and receiving circuit 9 to control circuit 15 in the main device. In response to this confirm data (NOT BSY), control circuit 15 immediately sends back through the same passage a speech start command to key telephone circuit 3 in the key telephone. Thus, key telephone circuit 3 disables the speaker/phone microphone muting circuit 34, which has been enabled during the processing of the busy tone detection, so that the key telephone 2 is automatically changed to hand-free speech mode.

Then, if the user picks up the handset 5, the key telephone circuit 3 in the key telephone 2 turns off the hand-free relay switch 12 and, at the same time, disables the speaker/phone amplifier set 29 and in turn enables the handset amplifier set 30. Thus, the user can talk through the handset 5. In this case, the line is connected by the turn on of hook switch 11b.

From a practical viewpoint, it is not sufficient to provide the tone detection circuit to detect the busy tone signal for effecting the auto-redialing function. According to the present embodiment, in order to properly detect the busy tone signal, an aid of microcomputer is necessary. Although the busy tone signal itself has a standard frequency and certain amplitude, such a signal may be deformed or may accompany noise signals during its transmission along the telephone line. Thus, microcomputer should be used to check whether or not the detected signal is the busy tone signal.

According to the present invention, since each extension telephone has the tone detection circuit 10 and means 3 for detecting a busy tone signal, microcomputer 15 provided in the main device is freed from extra burden, so that microcomputer 15 operates efficiently and rapidly.

According to the present invention, since the main device has a sound detection start command producing means 15 for producing the sound detection start command in response to the completion of sending the dial signal to the trunk line, and since each extension telephone has the busy tone detection means which is enabled in accordance with the sound detection start command, and a redialing control means which produces the dial command signal to the main device in accordance with the result of the busy tone detection, the tone signal sent from the trunk can be applied to the tone detection circuit and, also to speaker.

Also, by the above arrangement, the busy tone detection and processing can be started after completing the sending of the dial signal along the trunk and, thus, the side tone of the dial signal will not enter the tone detection circuit, thereby avoiding error operation.

Furthermore, by the above arrangement, it is not necessary to provide special noise filter in the tone detection circuit, resulting in simple in structure and cost effective, even if the tone detection circuit is employed in each extension telephone.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A key telephone apparatus having a main device which is connected to a telephone network line and a plurality of extension telephones connected to said main device through a voice transmission line for sending voice signal and a data transmission line for sending control data, said key telephone apparatus comprising:
    said main device comprising:
        switching means for connecting at least one of said extension telephone with said telephone network line;
        means for sending dial signal to said telephone network line in accordance with a dial command signal obtained from said extension telephone through said data transmission line;
        means for connecting said telephone network line with said extension telephone through said voice transmission line in accordance with said dial command signal; and
        means for generating and sending a sound detection start command through said data transmission line to said extension telephone after the completion of sending said dial signal to said telephone network line by said dial signal sending means; and
    said extension telephone comprising;
        inputting means for inputting a redial command;
        tone detection circuit for detecting a tone signal transmitted through said voice transmission line from said main device;
        means for generating and sending said dial command signal through said data transmission line to said main device in accordance with said redial command;

means, activated by said sound detection start command, for detecting a busy tone signal in an output signal from said tone detecting circuit; and means for regenerating said dial command signal when said detecting means detects said busy tone signal.

2. A key telephone apparatus as claimed in claim 1, wherein said extension telephone further comprises:

a speaker system for changing the signal obtained through said voice transmission line from said main device to audible signal;

a microphone system for transducing sound to electric signal for sending through said voice transmission line; and a directional coupler provided to said speaker system and microphone system for preventing a cross talk between the systems.

3. A key telephone apparatus as claimed in claim 2, wherein said tone detection circuit is connected to said speaker system.

* * * * *